(12) United States Patent
Moon et al.

(10) Patent No.: US 8,144,486 B2
(45) Date of Patent: Mar. 27, 2012

(54) POWER CONVERTER AND DRIVING METHOD THEREOF

(75) Inventors: Sang-Cheol Moon, Bucheon (KR); Gwan-Bon Koo, Bucheon (KR); Jin-Tae Kim, Bucheon-si (KR); Young-Bae Park, Anyang (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 548 days.

(21) Appl. No.: 12/258,157

(22) Filed: Oct. 24, 2008

(65) Prior Publication Data

US 2009/0231894 A1    Sep. 17, 2009

(30) Foreign Application Priority Data

Mar. 12, 2008  (KR) .................. 10-2008-0022960

(51) Int. Cl.
*H02M 3/335* (2006.01)
(52) U.S. Cl. .................. 363/21.12; 363/20; 323/271
(58) Field of Classification Search .............. 363/16–20, 363/21.02–21.04, 97, 98, 131, 40, 89; 323/282–288, 323/222; 315/209 R, 224, 307, 244
See application file for complete search history.

(56) References Cited

U.S. PATENT DOCUMENTS

| | | | |
|---|---|---|---|
| 4,984,145 A | 1/1991 | Dangschat et al. | |
| 5,412,556 A | 5/1995 | Marinus | |
| 5,469,349 A | 11/1995 | Marinus | |
| 5,497,311 A | 3/1996 | Hanawaka | |
| 5,575,837 A | 11/1996 | Kodama et al. | |
| 5,729,443 A | 3/1998 | Pavlin | |
| 5,734,564 A | 3/1998 | Brkovic | |
| 5,757,626 A | 5/1998 | Jovanovic et al. | |
| 5,784,231 A | 7/1998 | Majid et al. | |
| 5,831,839 A | 11/1998 | Pansier | |
| 5,874,841 A | 2/1999 | Majid et al. | |
| 5,991,172 A | 11/1999 | Jovanovic | |
| 5,995,383 A | 11/1999 | Poon et al. | |
| 6,078,510 A | 6/2000 | Spampinato et al. | |
| 6,256,210 B1 | 7/2001 | Strijker et al. | |
| 6,292,376 B1 | 9/2001 | Kato | |
| 6,341,073 B1* | 1/2002 | Lee | 363/21.02 |
| 6,421,256 B1* | 7/2002 | Giannopoulos et al. | 363/21.12 |
| 6,469,484 B2 | 10/2002 | L'Hermite et al. | |
| 6,853,563 B1 | 2/2005 | Yang et al. | |
| 6,999,324 B2 | 2/2006 | Feldtkeller | |

* cited by examiner

*Primary Examiner* — Rajnikant Patel
(74) *Attorney, Agent, or Firm* — Sidley Austin LLP

(57) ABSTRACT

In a power converter, a primary coil receives an input voltage, and a switch includes a first electrode, a second electrode coupled to the primary coil, and a control electrode. An output unit includes a secondary coil, and outputs an output voltage. The primary coil and the secondary coil form a transformer, and the input voltage is converted to the output voltage by the transformer. A controller receives a sensing voltage corresponding to a switch current flowing between the first electrode and the second electrode of the switch, detects a valley point of a voltage between the first electrode and the second electrode of the switch based on the sensing voltage, and transmits a control signal to the control electrode of the switch in accordance with the valley point.

27 Claims, 7 Drawing Sheets

POWER CONVERTER AND DRIVING METHOD THEREOF

CROSS-REFERENCE TO RELATED APPLICATION

This application claims priority to and the benefit of Korean Patent Application No. 10-2008-0022960 filed in the Korean Intellectual Property Office on Mar. 12, 2008, the entire contents of which are incorporated herein by reference.

BACKGROUND

1. Field of invention

The present invention relates to a power converter and a driving method thereof.

2. Description of the Related Art

A power converter, for example a switching mode power supply (SMPS), rectifies an input alternating current (AC) voltage to generate an input direct current (DC) voltage, and converts the input DC voltage to an output voltage having a different level from the input DC voltage.

A main switch of the power converter can be turned on when a switch voltage between the terminals of the main switch reaches a valley point at which the switch voltage has a lowest voltage.

However, the power converter requires a complex circuit to determine whether the switch voltage reached the valley point. Accordingly, the configuration and operation of the power converter can be complicated. In addition, the manufacturing cost of the power converter is increased by the complex circuit.

SUMMARY

Briefly and generally, embodiments include a power converter and a method for detecting a valley point of a switch voltage.

In an embodiment, a power converter including a primary coil, a switch, an output unit, and a controller is provided. The primary coil receives an input voltage, and the switch includes a first electrode, a second electrode coupled to the primary coil, and a control electrode. The output unit includes a secondary coil, and outputs an output voltage. The primary coil and the secondary coil form a transformer, and the input voltage is converted to the output voltage by the transformer. The controller receives a sensing voltage corresponding to a switch current flowing between the first electrode and the second electrode of the switch, detects a valley point of a voltage between the first electrode and the second electrode of the switch based on the sensing voltage, and transmits a control signal to the control electrode of the switch in accordance with the valley point.

In an embodiment, a power converter including a primary coil, a switch, an output unit, and a controller is provided. The primary coil receives an input voltage, and the switch includes a first electrode, a second electrode coupled to the primary coil, and a control electrode. The output unit includes a secondary coil, and outputs an output voltage. The primary coil and the secondary coil form a transformer, and the input voltage is converted to the output voltage by the transformer. The controller receives the input voltage, detects a valley point of a voltage between the first electrode and the second electrode of the switch based on the input voltage, and transmits a control signal to the control electrode of the switch in accordance with the valley point.

In an embodiment, a method of driving a power converter is provided. The power converter includes a transformer and a switch. The transformer includes a primary coil receiving an input voltage and a second coil transmitting an output voltage, and the switch includes a first electrode, a second electrode coupled to the primary coil, and a control electrode. The method includes turning on the switch in response to a first voltage of the control signal; turning off the switch in response to a second voltage of the control signal; detecting a first period based on a voltage of the primary coil of the transformer when the switch is turned off; detecting a second period based on a magnetizing inductance component of the transformer and a capacitance component of the switch; determining a valley point of a voltage between the first electrode and the second electrode of the switch based on the first period and the second period; and setting the control signal to the first voltage in response to the valley point.

DETAILED DESCRIPTION

Figure 1:
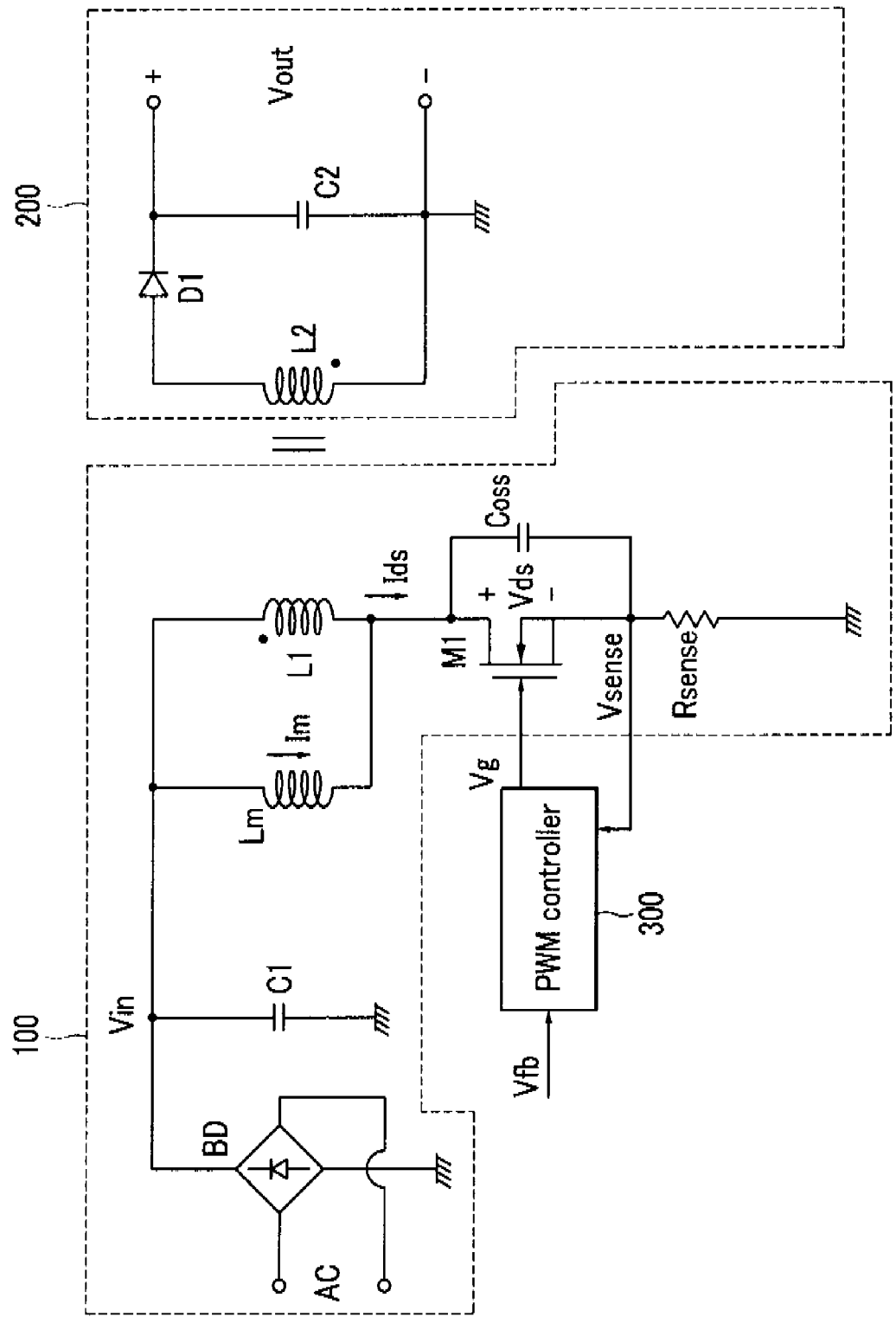
FIG. 1 is a circuit diagram of a power converter.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

A power converter and a driving method thereof according to an exemplary embodiment will be described with reference to FIG. 1 to FIG. 4.

FIG. 1 illustrates a power converter, including a power supplier 100, an output unit 200, and a pulse width modulation (PWM) controller 300.

The power supplier 100 may include a rectifier BD, a capacitor C1, a primary coil L1 of a transformer, a switch M1, and a sensing resistor Rsense. The rectifier BD may rectify an input AC voltage to output an input voltage Vin, and the capacitor C1 may smooth the input voltage Vin. The rectifier BD may include a full-wave bridge diode. The primary coil L1 may include a first terminal coupled to the rectifier BD and the capacitor C1, and a second terminal. A magnetizing inductance component Lm may be formed between the two terminals of the primary coil L1.

The switch M1 may include a control electrode and two other electrodes that may correspond to a gate, a drain, and a source, respectively. A capacitance component Coss may be formed between the drain and the source of the switch M1.

The drain of the switch M1 can be coupled to the second terminal of the primary coil L1. While the switch M1 has been exemplified as an n-channel field effect transistor in FIG. 1, various other transistors may used as the switch M1.

The sensing resistor Rsense can be coupled between the source of the switch M1 and a voltage terminal, for example a ground terminal. The sensing resistor Rsense senses a switch current Ids flowing from the drain of the switch M1 to the source of the switch M1 when the switch M1 is turned on, and can output a sensing voltage Vsense corresponding to the switch current Ids to the PWM controller 300.

The output unit 200 may include a secondary coil L2 of the transformer, a diode D1, and a capacitor C2. In addition, the output unit 200 may include two output terminals (+) and (−). The output terminal (−) can be coupled to a voltage terminal, for example the ground terminal. A voltage between the two output terminals (+) and (−) is an output voltage Vout of the output unit 200.

The secondary coil L2 can include a first terminal coupled to an anode of the diode D1, and a second terminal. A cathode of the diode D1 is coupled to the output terminal (+). The capacitor C2 includes one terminal coupled to the output terminal (+), and another terminal, coupled to the second terminal of the secondary coil L2 and the output terminal (−).

The PWM controller 300 can receive a feedback voltage Vfb and the sensing voltage Vsense. The feedback voltage Vfb may be a voltage that is generated by a feedback circuit (not shown) and correspond to the output voltage Vout of the output unit 200. The PWM controller 300 can detect a time when a switch voltage Vds between the drain and the source of the switch M1 reaches a valley, i.e., the lowest value (hereinafter, "a time when a switch voltage Vds between the drain and the source of the switch M1 reaches a valley" will be referred to as "a valley point") based on the feedback voltage Vfb and the sensing voltage Vsense. The PWM controller 300 can generate a clock signal CLK in accordance with the valley point. In addition, the PWM controller 300 can generate a gate control signal Vg for turning on or turning off the switch M1 in accordance with the clock signal CLK.

When the switch M1 is an n-channel transistor, the gate control signal Vg has a high voltage for turning on the switch M1 or a low voltage for turning off the switch M1.

On the other hand, when the switch M1 is a p-channel transistor, the gate control signal Vg may have a low voltage for turning on the switch M1 or a high voltage for turning off the switch M1.

Next, a PWM controller will be described with reference to FIGS. 2-4.

Figure 2:
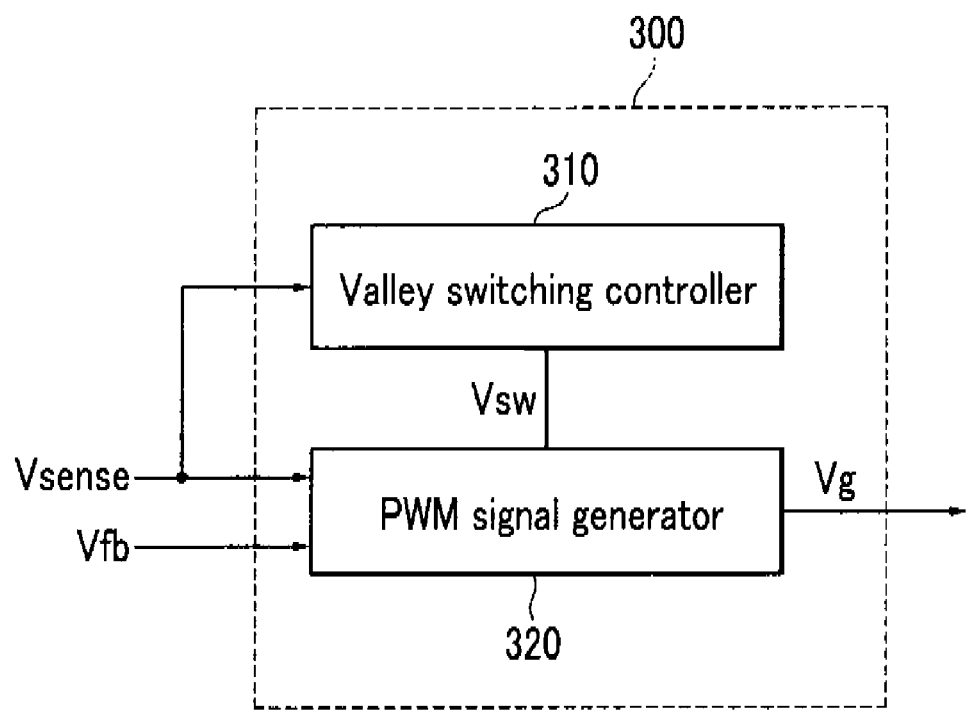
FIG. 2 is a block diagram of a PWM controller.
Figure 3:
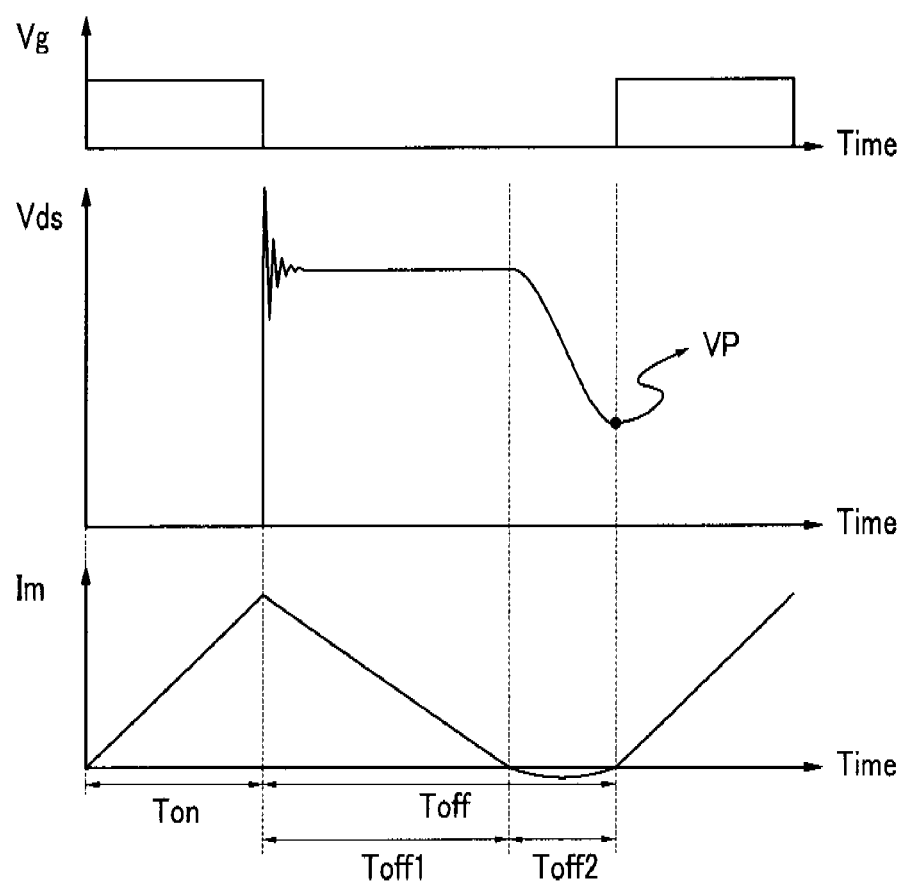
FIG. 3 is a timing diagram of a power converter.
Figure 4:
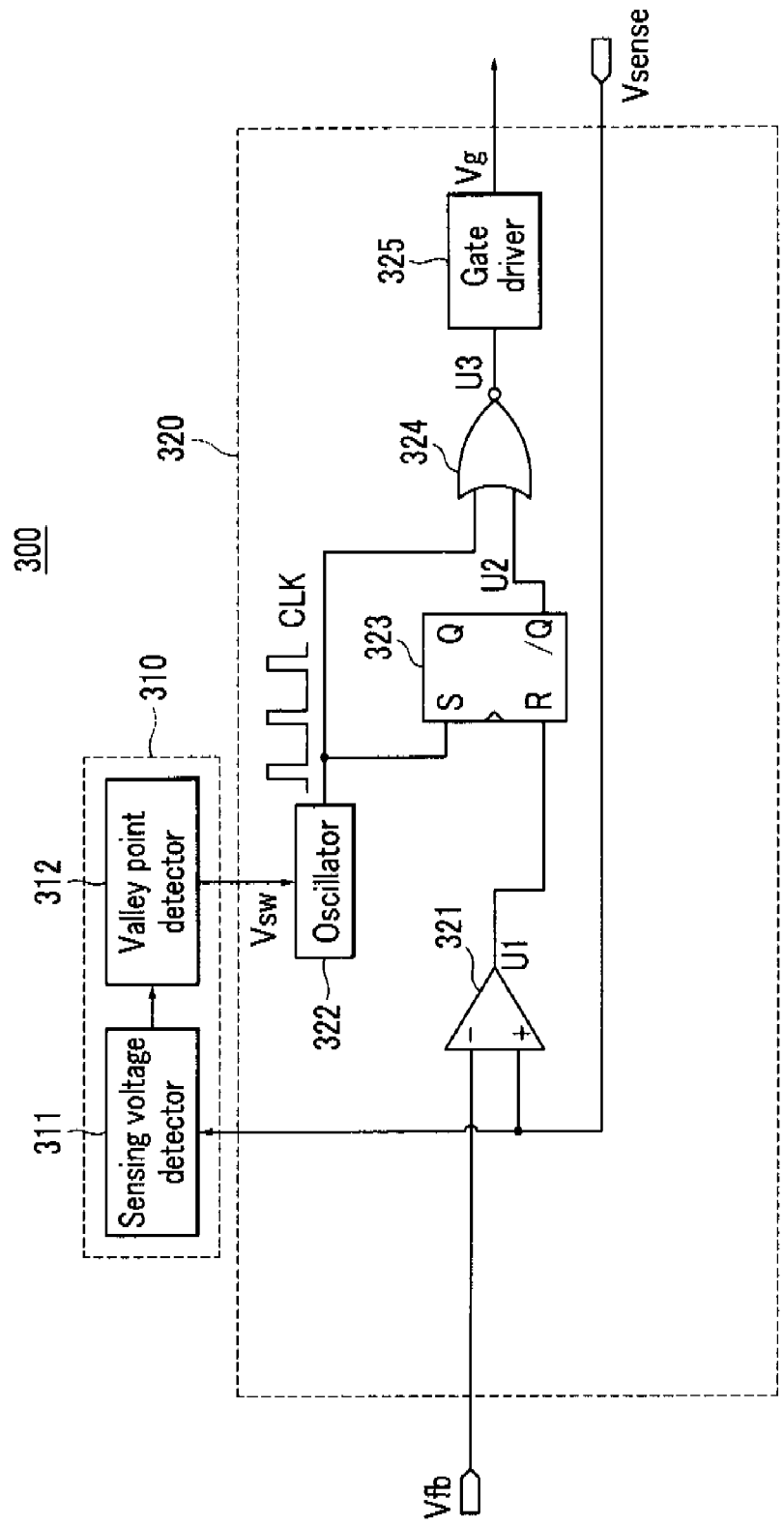
FIG. 4 is a circuit diagram of one example of the PWM controller shown in FIG. 2.

FIG. 2 is a block diagram of a PWM controller, FIG. 3 is a timing diagram of a power converter, and FIG. 4 is a circuit diagram of one example of the PWM controller shown in FIG. 2.

Referring to FIG. 2, a PWM controller 300 can include a valley switching controller 310 and a PWM signal generator 320.

The valley switching controller 310 may receive the sensing voltage Vsense, detect the valley point VP of the switch voltage Vds based on the sensing voltage Vsense, and generate a valley switching signal Vsw in accordance with the valley point VP. The PWM signal generator 320 can receive the valley switching signal Vsw, the feedback voltage Vfb, and the sensing voltage Vsense, and generate the gate control signal Vg.

Referring to FIG. 1 to FIG. 3, in an "on period" Ton, the gate control signal Vg can have a high voltage such that the switch M1 is turned on. In this period, a magnetizing current Im flowing through the magnetizing inductance component Lm can be linearly increased by the input voltage Vin. The magnetizing current Im can be substantially equal to the switch current Ids of the switch M1.

In a subsequent off period Toff, the gate control signal Vg can have a low voltage such that the switch M1 is turned off. The off period Toff may be divided into a period Toff1 in which the magnetizing current Im is decreased from a maximum value Ipk to 0 A and a period Toff2 in which the switch voltage Vds reaches the valley point from an end point of the period Toff1. Since the magnetizing current Im, closely related to the switch current Ids, has a maximum value just before the switch M1 is turned off, the valley switching controller 310 can detect the maximum value Ipk of the switch current Ids at a time between the on period Ton and the off period Toff. The valley switching controller 310 can calculate the maximum value Ipk of the switch current Ids based on the sensing voltage Vsense at a turn-off time of the switch M1.

While the switch M1 is turned off, the magnetizing current Im can be freewheeled through the magnetizing inductance component Lm and the primary coil L1. Since a voltage at the primary coil L1 of the transformer (hereinafter referred to as "a primary voltage") is n times of the output voltage Vout, the magnetizing current Im is linearly decreased with a slope of n*Vout/Lm. (Here, n=N1/N2, a ratio of the number N1 of turns of the primary coil L1 to the number N2 of turns of the secondary coil L2.) Accordingly, the period Toff1 in which the magnetizing current Im is decreased from the maximum value Ipk to 0 A may be calculated by the valley switching controller 310 based on an inductance Lm of the magnetizing inductance component Lm, the maximum value Ipk of the switch current Ids, and the output voltage Vout, as:

$$Toff1 = \frac{L_m \cdot Ipk}{n \cdot Vout} \qquad (1)$$

In addition, the valley switching controller 310 can calculate the on period Ton by counting from a time at which the switch M1 is turned on to a time at which the switch current Ids has the maximum value Ipk.

When the magnetizing current Im reaches 0 A, an LC resonance may occur between the capacitance component Coss of the switch M1 and the magnetizing inductance component Lm. As a result, the magnetizing current Im can be changed to a sinusoidal wave. The switch voltage Vds can reach the valley point VP at which the switch voltage Vds has a minimum value when the magnetizing current Im reaches a half cycle of the sine wave. Accordingly, the valley switching controller 310 may calculate the period Toff2 in which the switch voltage Vds reaches the valley point from an end point of the period Toff1 as expressed in Equation 2. Eq.(2) shows that the period Toff2 is substantially the same as the half cycle of the sine wave, i.e., a half resonance cycle between the capacitance component Coss and the magnetizing inductance component Lm:

$$Toff2 = \frac{2\pi\sqrt{L_m \cdot C_{oss}}}{2} \qquad (2)$$

After detecting the valley point VP of the switch voltage Vds based on the periods Toff1 and Toff2 calculated using Equations 1 and 2 and the on period Ton, the valley switching controller 310 can generate the valley switching signal Vsw having a predetermined level, for example a high level, and transmit it to the PWM signal generator 320.

The PWM signal generator 320 can generate a clock signal CLK having a predetermined cycle in response to the high level of the valley switching signal Vsw. The clock signal CLK alternately has a high level and a low level. The PWM signal generator 320 may compare the feedback voltage Vfb and the sensing voltage Vsense, and control the switch M1 based on the comparison result and the clock signal CLK. The PWM signal generator 320 can generate a gate control signal Vg based on the comparison result and the clock signal CLK, and transmit it to the switch M1.

Referring to FIG. 3 and FIG. 4, one example of the valley switching controller 310 may include a sensing voltage detector 311 and a valley point detector 312. One example of the PWM signal generator 320 may include a comparator 321, an oscillator 322, a flip-flop 323, a NOR gate 324, and a gate driver 325.

The sensing voltage detector 311 can detect the maximum value Ipk of the switch current Ids based on the sensing voltage Vsense. The sensing voltage detector 311 can transmit the detected maximum value Ipk to the valley point detector 312. As expressed in Equation 1, the valley point detector 312 may calculate the period Toff1 from the maximum value Ipk of the switch current Ids and the output voltage Vout (or primary voltage n*Vout when the switch M1 is turned off). The valley point detector 312 may calculate the period Toff2 from the half resonance cycle as expressed in Equation 2. When the valley point detector 312 detects the valley point of the switch voltage Vds by using the two periods Toff1 and Toff2 and the on period Ton, the valley point detector 312 can transmit the valley switching signal Vsw having the high level to the oscillator 322.

The comparator 321 may include an inverting terminal (−) receiving the feedback voltage Vfb and a non-inverting terminal (+) receiving the sensing voltage Vsense, and compare the feedback voltage Vfb and the sensing voltage Vsense to generate a comparator output U1. The comparator 321 may output the comparator output U1 to the flip-flop 323. The comparator output U1 has the low level when the feedback voltage Vfb is higher than the sensing voltage Vsense. The comparator output U1 has the high level when the feedback voltage Vfb is lower than the sensing voltage Vsense.

The oscillator 322 can generate a clock signal CLK having a predetermined cycle in response to the high level of the valley switching signal Vsw, and transmit the clock signal CLK to the flip-flop 323 and the NOR gate 324.

The flip-flop 323 may include a set terminal S receiving the clock signal CLK, a reset terminal R receiving the comparator output U1, an output terminal Q, and an inverted output terminal /Q. An RS flip-flop may be used as the flip-flop 323. The flip-flop 323 can generate a flip-flop output U2 based on the comparator output U1 and the clock signal CLK, and output the flip-flop output U2 to the NOR gate 324 through the inverted output terminal /Q. In detail, when the clock signal CLK having the high level is input to the set terminal, the flip-flop 323 outputs the flip-flop output U2 having the low level to the inverted output terminal /Q. When the comparator output U1 having the high level is input to the reset terminal R, the flip-flop 323 outputs the flip-flop output U2 having the high level to the inverted output terminal /Q.

The NOR gate 324 can generate a NOR gate output U3 by a NOR operation of the clock signal CLK and the flip-flop output U2, and output the signal U3 to the gate driver 325. The gate driver 325 can generate a gate control signal Vg having the high voltage when the NOR gate output U3 is the high level, and can generate the gate control signal Vg having the low voltage when the NOR gate output U3 is the low level. The gate driver 325 outputs the gate control signal Vg to the gate of the switch M1.

Next, an operation of the PWM signal generator 320 will be described.

In the off period Toff, the sensing voltage Vsense is lower than the feedback voltage Vfb such that the comparator output U1 having the low level is input to the reset terminal R of the flip-flop 323. When detecting the valley point VP, the valley point detector 312 outputs the valley switching signal Vsw having the high level. The oscillator 322 sets the clock signal CLK as the high level in response to the high level of the valley switching signal Vsw. Then, the flip-flop 323 outputs the flip-flop output U2 having the low level at the inverted output terminal /Q. Since the clock signal CLK alternately has a high level and a low level, the clock signal CLK is changed to the low level. After the clock signal CLK is changed to the low level, the flip-flop 323 maintains the flip-flop output U2 at the low level, and the NOR gate 324 outputs the NOR gate output U3 having the high level. Accordingly, the gate driver 325 outputs the gate control signal Vg having the high voltage to turn on the switch M1, and the on period Ton starts again.

In the on period Ton, the switch current Ids of the switch M1 can be increased by the turn-on of the switch M1. In this case the sensing voltage Vsense can be increased. When the sensing voltage Vsense becomes higher than the feedback voltage Vfb, the comparator 321 can output the comparator output U1 having the high level. The flip-flop 323 can receive the comparator output U1 having the high level through the reset terminal R, and output the flip-flop output U2 having the high level to the inverted output terminal /Q. Accordingly, the NOR gate 324 can output the NOR gate output U3 having the low level. As a result, the gate driver 325 outputs the gate control signal Vg having the low voltage to turn off the switch M1, and the off period Toff starts again.

In the off period Toff, the switch current Ids of the switch M1 can be decreased by the turn-off of the switch M1, thereby the sensing voltage Vsense is decreased. Then, the comparator output U1 can be changed to the low level such that the flip-flop output U2 is maintained at the high level, and the gate control signal Vg is maintained at the low voltage. When the oscillator 322 receives the valley switching signal Vsw having the high level again, the oscillator 322 can control the clock signal CLK such that the gate driver 325 outputs the gate control signal Vg having the high voltage.

As described above, the period Toff1 can be calculated from the maximum value Ipk of the switch current Ids and the output voltage Vout, the period Toff2 can calculated by the half resonance cycle between the capacitance component Coss of the switch M1 and the magnetizing inductance component Lm, and the on period Ton can calculated by counting from the point at which the switch M1 is turned on to the point at which the switch current Ids has the maximum value Ipk. Accordingly, the valley point can be calculated accurately.

Next, another embodiment of a power converter and a driving method thereof will be described with reference to FIG. 5 to FIG. 8.

Figure 5:
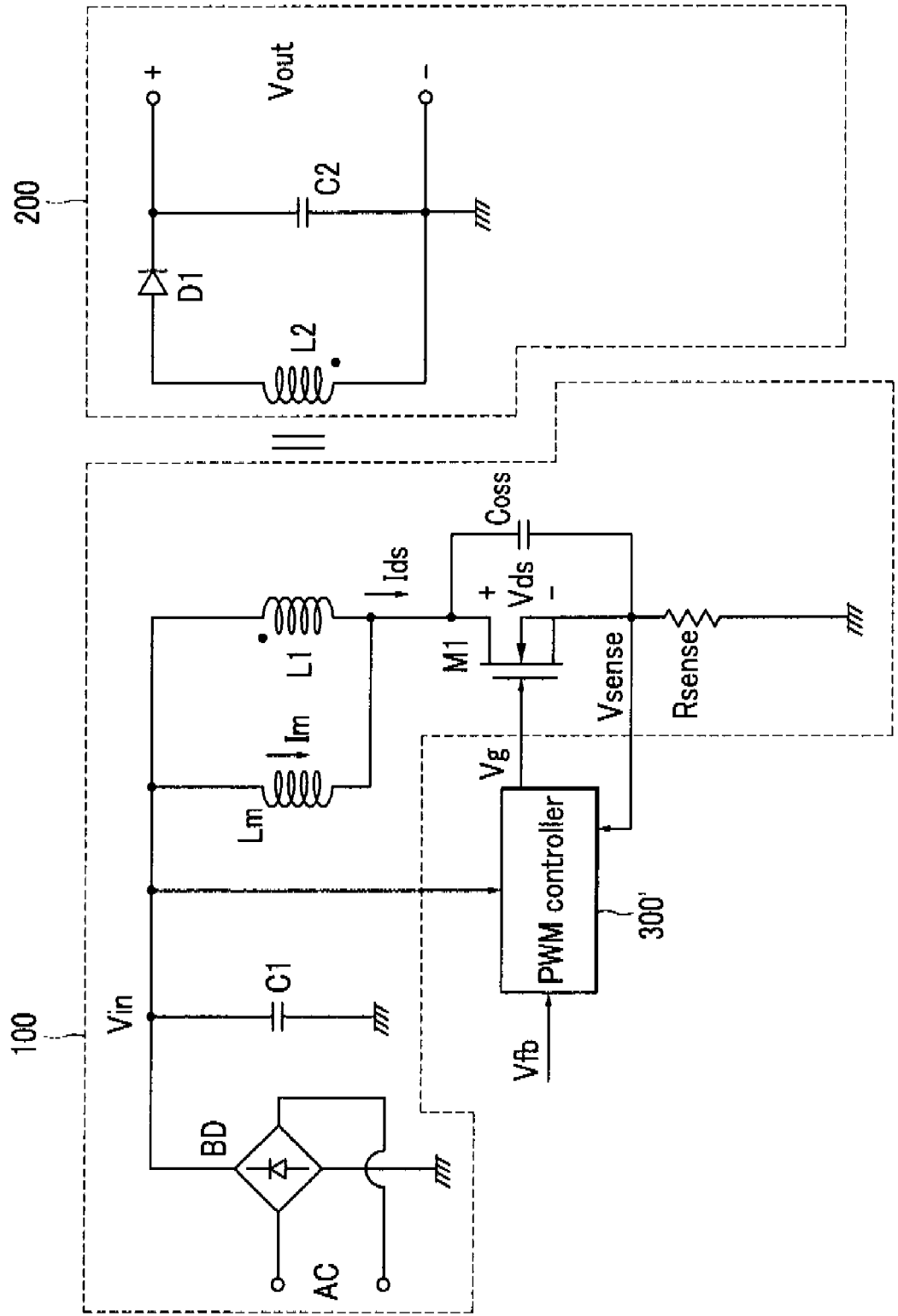
FIG. 5 is a circuit diagram of a power converter.
Figure 6:
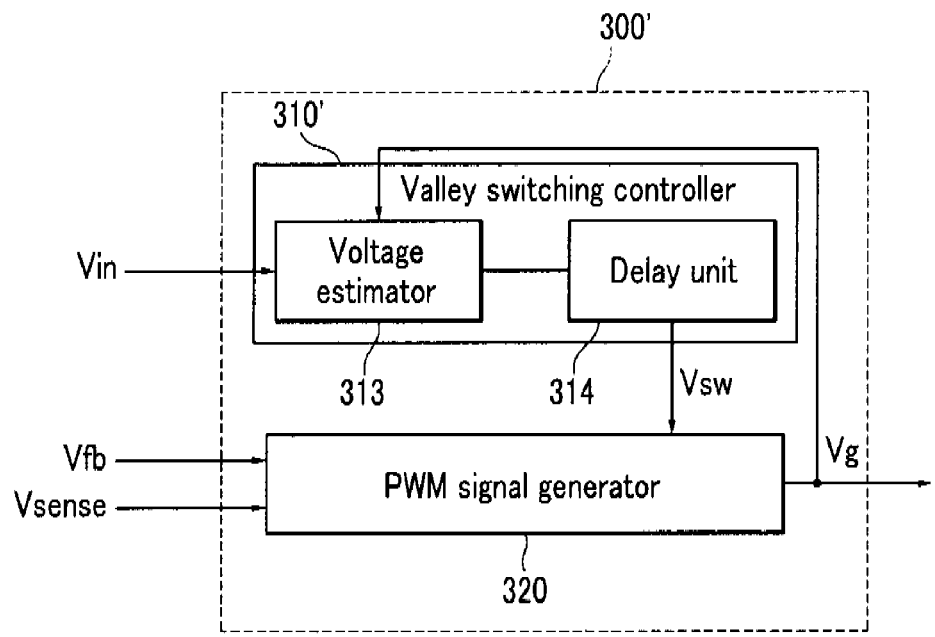
FIG. 6 is a block diagram of a PWM controller.
Figure 7:
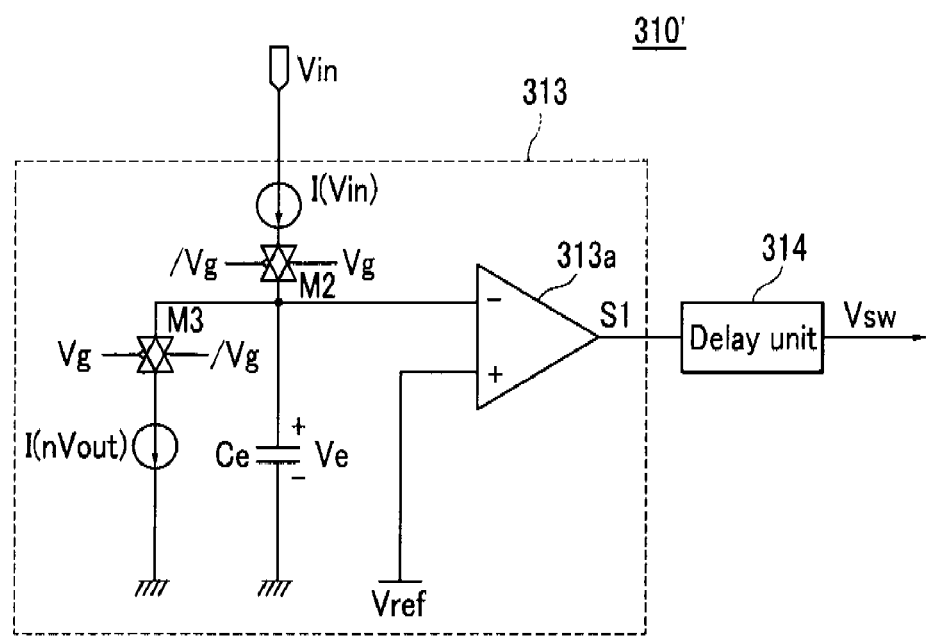
FIG. 7 is a block diagram of one example of a valley switching controller shown in FIG. 6.
Figure 8:
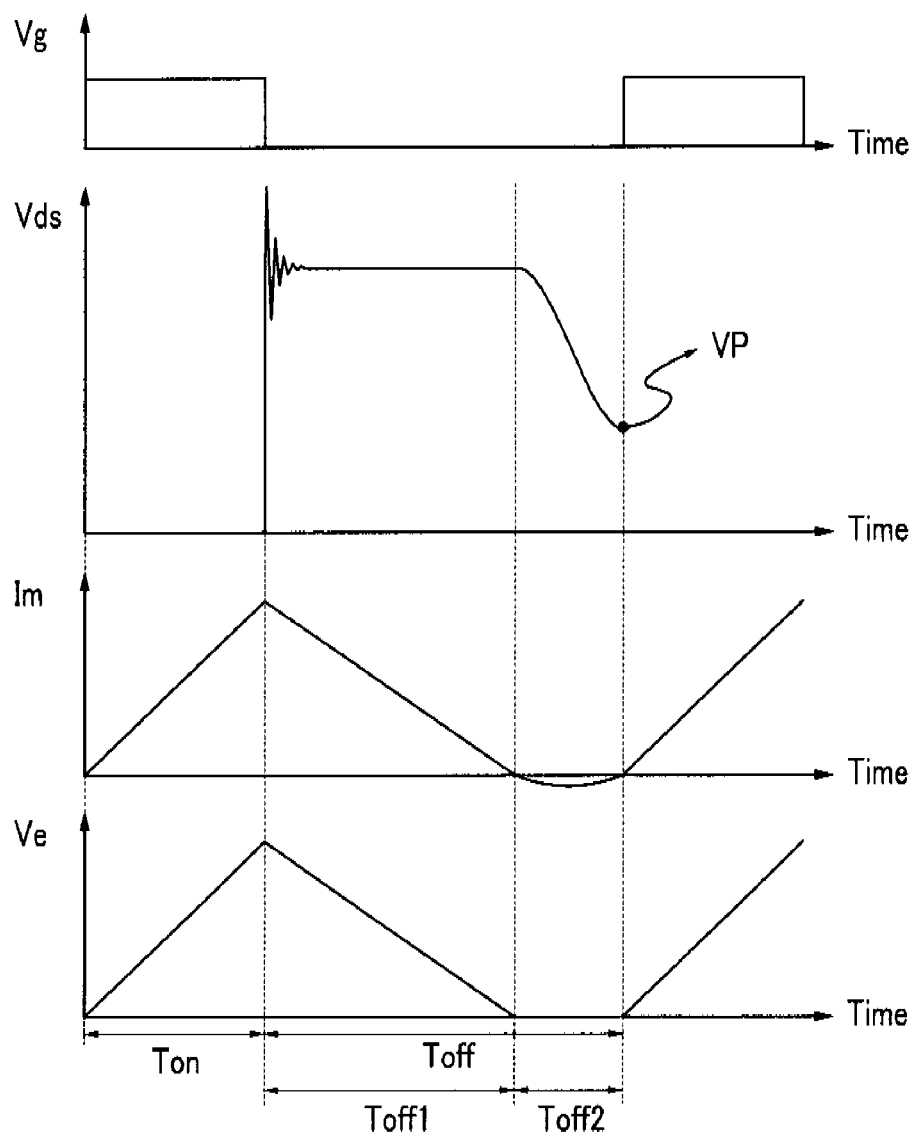
FIG. 8 is a timing diagram of a power converter.

FIG. 5 is a circuit diagram of a power converter. FIG. 6 is a block diagram of a PWM controller, FIG. 7 is a block diagram of one example of a valley switching controller shown in FIG. 6, and FIG. 8 is a timing diagram of a power converter.

Referring to FIG. 5 and FIG. 6, a power converter may include a power supplier 100, an output unit 200, and a PWM controller 300'. The PWM controller 300' may include a valley switching controller 310' and a PWM signal generator 320.

The PWM controller 300' may further receive an input voltage Vin from the power supplier 100.

The valley switching controller 310' may receive the input voltage Vin, and detect a valley point of a switch voltage Vds to generate a valley switching signal Vsw having the high level, and include a voltage estimator 313 and a delay unit 314. The PWM signal generator 320 shown in FIG. 6 may perform analogous operations as the PWM signal generator 320 shown in FIG. 2.

Referring to FIG. 7, one example of the voltage estimator 313 can include a comparator 313a, a capacitor Ce, and switches M2 and M3.

The comparator 313a can include an inverting terminal (−) coupled to one terminal the capacitor Ce and a non-inverting terminal(+) receiving a reference voltage Vref. Another terminal of the capacitor Ce can be coupled to a voltage terminal, for example the ground terminal.

The switch M2 can be coupled between a current source I(Vin) and the inverting terminal (−) of the comparator 313a, and can be turned on in response to the high voltage of the gate control signal Vg. The current source I(Vin) may supply a current that is proportional to the input voltage Vin during the on period Ton. The switch M3 can be coupled between a current source I(nVout) and the inverting terminal (−) of the comparator 313a, and can be turned on in response to the low voltage of the gate control signal Vg. The current source I(nVout) may supply a current that is proportional to the primary voltage n*Vout of the off period Toff. While each of the switches M2 and M3 has been exemplified as a transmission gate operated in response to the gate control signal Vg and an inverted gate control signal /Vg, other switches may be used as the switches M2 and M3.

Next, an operation of the voltage estimator 313 will be described with reference to FIG. 8. Referring to FIG. 8, in the on period Ton, the gate control signal Vg can have the high voltage such that the switches M1 and M2 are turned on. Then, the magnetizing current Im of the magnetizing inductance component Lm is linearly increased by the input voltage Vin. The capacitor Ce is charged by the input current I(Vin) that is proportional to the input voltage Vin such that a voltage Ve of the capacitor Ce is increased. When the voltage Ve of the capacitor Ce is higher than the reference voltage Vref, the comparator 313a can output a comparator output S1 having the low level.

Next, in the off period Toff, the gate control signal Vg can have the low voltage such that the switches M1 and M2 are turned off, and the switch M3 is turned on. Then, the magnetizing current Im may be freewheeled to be linearly decreased, and the capacitor Ce is discharged by the input current I(nVout) that is proportional to the primary voltage n*Vout. When the magnetizing current Im is decreased to 0 A, the voltage charged to the capacitor Ce during the on period Ton is fully discharged. The reference voltage Vref may be set to be similar to a voltage of another terminal of the capacitor Ce, i.e., 0V. Then, when the voltage charged to the capacitor Ce is fully discharged, the comparator 313a outputs the comparator output S1 having the high level.

A period between a time at which the gate control signal Vg becomes the high voltage and a time at which the comparator output S1 becomes the high level is substantially the same as a sum of the on period Ton and the period Toff1. Accordingly, the voltage estimator 313 can detect the sum of the on period Ton and the period Toff1.

As described above, since the period Toff2 is calculated by Equation 2, the delay unit 314 can delay the comparator output S1 having the high level by the period Toff2, and output the delayed comparator output S1 as the valley switching signal Vsw. Accordingly, the valley switching controller 310' can transmit the valley switching signal Vsw having the high level to the PWM signal generator 320 at the valley point VP.

In the above described embodiments, the valley point of the switch voltage can be detected accurately. In addition, the power converter can detect the valley point with a simple configuration.

While this invention has been described in connection with what is presently considered to be specific embodiments, it is to be understood that the invention is not limited to the disclosed embodiments, but, on the contrary, is intended to cover various modifications and equivalent arrangements included within the spirit and scope of the appended claims.

The invention claimed is:

1. A power converter comprising:
    a primary coil configured to receive an input voltage;
    a switch, including a first electrode, a second electrode coupled to the primary coil, and a control electrode;
    an output unit, including a secondary coil, the output unit configured to output an output voltage, the primary coil and the secondary coil forming a transformer, and the input voltage being converted to the output voltage by the transformer; and
    a controller configured
        to receive a sensing voltage corresponding to a switch current flowing between the first electrode and the second electrode of the switch;
        to detect a maximum value of the switch current based on the sensing voltage;
        to detect a valley point of a voltage between the first electrode and the second electrode of the switch based on the sensing voltage; and
    to transmit a control signal having a first voltage for turning on the switch and a second voltage for turning off the switch to the control electrode of the switch in accordance with the valley point,
    wherein an off period in which the control signal has the second voltage includes a first period and a second period, and
    wherein the controller is configured to calculate the first period of the off period based on the maximum value of the switch current, and to detect the valley point by using a third period in which the control signal has the first voltage, the calculated first period, and the second period.

2. The power converter of claim 1, wherein the valley point is a time when the voltage between the first electrode and the second electrode of the switch substantially reaches a valley.

3. The power converter of claim 1, wherein
    the controller is configured to set the control signal to the first voltage in response to the valley point.

4. The power converter of claim 1, wherein
    the first period is substantially the same as a period in which the magnetizing current is changed from the maximum value to 0 A; and
    the off period is substantially the same as a sum of the first period and the second period.

5. The power converter of claim 1, wherein the controller is configured to calculate the second period based on a magnetizing inductance component of the transformer and a capacitance component of the switch.

6. The power converter of claim 5, wherein the second period is substantially the same as a half resonance cycle between the magnetizing inductance component and the capacitance component.

7. The power converter of claim 1, wherein the first period is determined by a magnetizing inductance component of the transformer, the maximum value, the output voltage, and a ratio of the number of turns of the primary coil to the number of turns of the secondary coil.

8. The power converter of claim 7, wherein the first period is substantially the same as a value obtained by dividing a product of an inductance of the magnetizing inductance component and the maximum value by a product of the output voltage and the ratio.

9. The power converter of claim 1, wherein the first period is determined by a magnetizing inductance component of the transformer, the maximum value, and a voltage of the primary coil when the switch is turned off.

10. The power converter of claim 1, wherein the controller comprises:
an oscillator configured to generate a clock signal in response to the valley point;
a comparator configured to output a first signal according to a comparison between the sensing voltage and the feedback voltage;
a flip-flop configured to output a second signal in accordance with the first signal and the clock signal;
a logic circuit configured to output a third signal by a logic operation of the clock signal and the second signal; and
a gate driver configured to generate the control signal in response to the third signal.

11. A power converter comprising:
a primary coil configured to receive an input voltage;
a switch, including a first electrode, a second electrode coupled to the primary coil, and a control electrode;
an output unit, including a secondary coil, and configured to output an output voltage, the primary coil and the secondary coil forming a transformer, and the input voltage being converted to the output voltage by the transformer; and
a controller comprising
a first current source configured to output a first current corresponding to the input voltage when the switch is turned on; and
a second current source configured to output a second current corresponding to a voltage of the primary coil of the transformer when the switch is turned off, and configured
to receive the input voltage;
to detect a valley point of a voltage between the first electrode and the second electrode of the switch by using the first current source and the second current source; and
to transmit a control signal to the control electrode of the switch in accordance with the valley point.

12. The power converter of claim 11, wherein the valley point is a time when the voltage between the first electrode and the second electrode of the switch substantially reaches a valley.

13. The power converter of claim 11, wherein
the control signal has a first voltage for turning on the switch or a second voltage for turning off the switch; and
the controller is configured to set the control signal to the first voltage in response to the valley point.

14. The power converter of claim 13, wherein
an off period in which the control signal has the second voltage includes a first period and a second period;
the controller further comprises a capacitor configured to be charged during a third period in which the control signal has the first voltage, and to be discharged by the second current during the first period; and
the controller is configured to detect a sum of the first period and the third period based on a voltage of the capacitor to detect the valley point.

15. The power converter of claim 14, wherein the first period is substantially the same as a period in which the magnetizing current is changed from the maximum value to 0 A, and the off period is substantially the same as a summation of the first period and the second period.

16. The power converter of claim 14, wherein
the controller further comprises a comparator including an inverse terminal coupled to the capacitor and a non-inverse terminal receiving a reference voltage; and
the controller is configured to detect the sum based on an output of the comparator.

17. The power converter of claim 16, wherein the controller is configured to delay the output of the comparator by the second period to detect the valley point.

18. The power converter of claim 16, wherein the controller is configured to calculate the second period based on a magnetizing inductance component of the transformer and a capacitance component of the switch.

19. The power converter of claim 18, wherein the second period is substantially the same as a half resonance cycle between the magnetizing inductance component and the capacitance component.

20. The power converter of claim 11, wherein the controller comprises:
an oscillator configured to generate a clock signal in response to the valley point;
a comparator configured to output a first signal according to a comparison between a sensing voltage and a feedback voltage, the sensing voltage corresponding to a current flowing between the first electrode and the second electrode of the switch, and the feedback voltage corresponding to the output voltage;
a flip-flop configured to output a second signal in accordance with the first signal and the clock signal;
a logic circuit configured to output a third signal by a logic operation of the clock signal and the second signal; and
a gate driver configured to generate the control signal in response to the third signal.

21. A method of driving a power converter, the converter comprising a transformer including a primary coil receiving an input voltage and a second coil transmitting an output voltage, and a switch including a first electrode, a second electrode coupled to the primary coil, and a control electrode receiving a control signal, the method comprising:
turning on the switch in response to a first voltage of the control signal;
turning off the switch in response to a second voltage of the control signal for an off period;
detecting a maximum value of a current flowing between the first electrode and the second electrode of the switch;
calculating a first period of the off period based on a voltage of the primary coil of the transformer when the switch is turned off and the maximum value of the current;
detecting a second period based on a magnetizing inductance component of the transformer and a capacitance component of the switch;
determining a valley point of a voltage between the first electrode and the second electrode of the switch based on the calculated first period and the second period; and
setting the control signal to the first voltage in response to the valley point.

22. The method of claim 21, wherein the valley point is a time when the voltage between the first electrode and the second electrode of the switch substantially reaches a valley.

23. The method of claim 21, wherein
the valley point is determined by the first period, the second period, and a third period in which the control signal has the first voltage.

24. A method of driving a power converter, the converter comprising a transformer including a primary coil receiving an input voltage and a second coil transmitting an output voltage, and a switch including a first electrode, a second electrode coupled to the primary coil, and a control electrode receiving a control signal, the method comprising:
turning on the switch in response to a first voltage of the control signal;
turning off the switch in response to a second voltage of the control signal;
determining a valley point of a voltage between the first electrode and the second electrode of the switch based on a first current and a second current, the first current corresponding to the input voltage when the control signal has the first voltage and the second current corresponding to the voltage of the primary coil when the control signal has the second voltage; and
setting the control signal to the first voltage in response to the valley point.

25. The method of claim 21, wherein the second period is substantially the same as a half resonance cycle between the magnetizing inductance component and the capacitance component.

26. The method of claim 24, wherein determining the valley point comprises:
charging the first current to a capacitor during a first period in response to the first voltage of the control signal;
discharging the second current to the voltage of the primary coil from the capacitor during a second period in response to the second voltage of the control;
detecting a sum of the first period and the second period based on a voltage of the capacitor; and
determining the valley point by using the sum.

27. The method of claim 26, further comprising detecting a third period based on a magnetizing inductance component of the transformer and a capacitance component of the switch, and
wherein the valley point is determined by a sum of the first period, the second period, and the third period.

* * * * *